United States Patent [19]

Schmidt et al.

[11] Patent Number: 5,765,360
[45] Date of Patent: Jun. 16, 1998

[54] PROCESS FOR COOLING ENGINE WALLS AND WALL STRUCTURE FOR CARRYING OUT THE PROCESS

[75] Inventors: Günther Schmidt, Taufkirchen; Michael Popp, Brunnthal, both of Germany

[73] Assignee: Daimler-Benz Aerospace AG, Munich, Germany

[21] Appl. No.: 602,216

[22] Filed: Feb. 16, 1996

[30] Foreign Application Priority Data

Feb. 17, 1995 [DE] Germany ............... 195 05 357.5

[51] Int. Cl.$^6$ ................... F02K 9/64; F02C 7/20
[52] U.S. Cl. ................... 60/204; 60/267; 60/260; 60/39.32; 165/169
[58] Field of Search ............. 60/204, 266, 267, 60/260, 39.32, 730, 752, 271, 39.511, 256; 165/169

[56] References Cited

U.S. PATENT DOCUMENTS

| | | | |
|---|---|---|---|
| 3,036,428 | 5/1962 | Chillson | 60/260 |
| 3,086,358 | 4/1963 | Tumavicus | 60/39.66 |
| 3,516,254 | 6/1970 | Hammond | 60/267 |
| 3,605,412 | 9/1971 | Stockel | 60/267 |
| 3,782,118 | 1/1974 | Butter et al. | 60/267 |
| 4,055,044 | 10/1977 | Dederra et al. | 60/267 |
| 4,078,604 | 3/1978 | Christl et al. | 60/267 |
| 4,879,874 | 11/1989 | Koyari et al. | 60/267 |
| 5,048,289 | 9/1991 | Brown | 60/267 |
| 5,647,202 | 7/1997 | Althaus | 60/266 |

FOREIGN PATENT DOCUMENTS

17 51 691   1/1973   Germany.

*Primary Examiner*—Timothy Thorpe
*Assistant Examiner*—Ted Kim
*Attorney, Agent, or Firm*—McGlew and Tuttle

[57] ABSTRACT

Cooling of engine walls with fuel, wherein the walls have a structure which has an inner wall, to which hot gas is admitted during the operation, a colder outer wall, as well as a plurality of webs which connect the walls and divide the hollow space present there into a plurality of cooling ducts.

The fuel is introduced in the cold state into the wall structure, is delivered through the cooling ducts while absorbing heat via the inner wall, and is subsequently used to generate thrust.

A hot fluid flow taken from the engine is admitted during the operation from the outside to the "cold" outer wall of the wall structure, through which fuel flows, and this "cold" outer wall thermally expands as a result, or its thermal contraction is reduced.

11 Claims, 2 Drawing Sheets

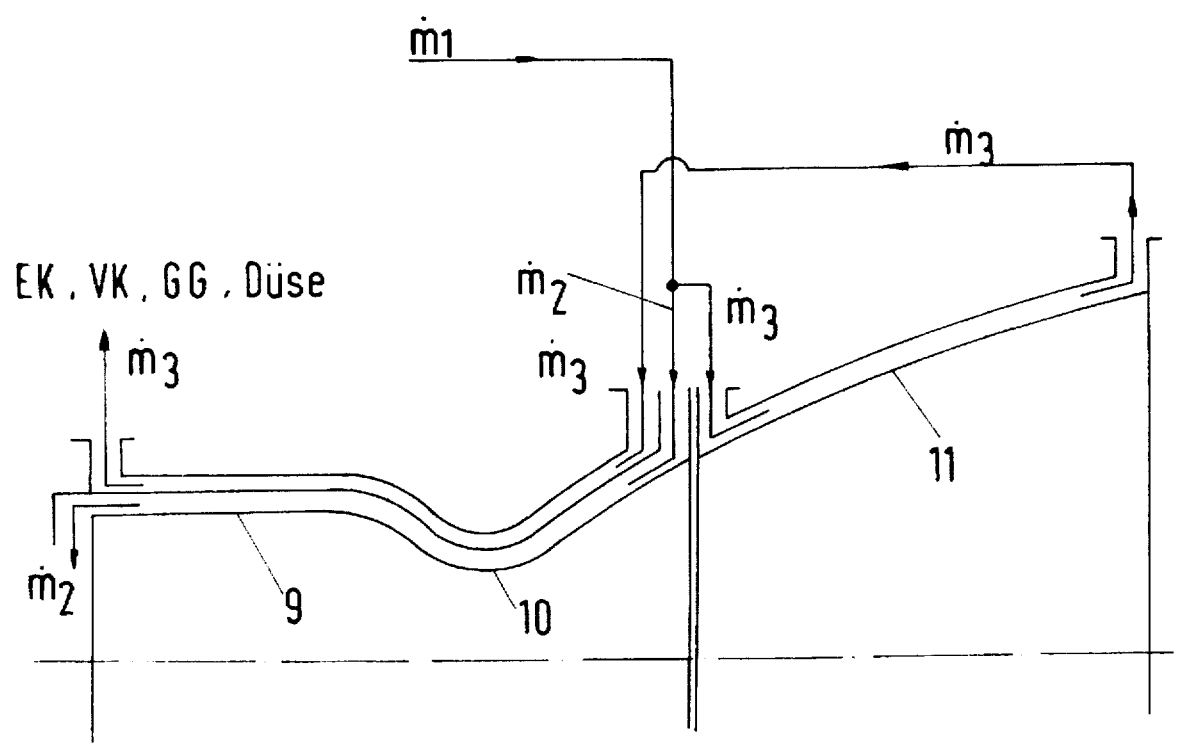

PROCESS FOR COOLING ENGINE WALLS AND WALL STRUCTURE FOR CARRYING OUT THE PROCESS

FIELD OF THE INVENTION

The present invention pertains to a process for cooling engine walls with fuel, wherein the walls have a structure which has an inner wall, to which hot gas is admitted during the operation, an outer wall, which is colder during the operation, as well as a plurality of webs which connect the inner wall to the outer wall and divide the hollow space present there into a plurality of cooling ducts, particularly for cooling firing chamber walls and thrust nozzle walls of rocket engines with cryogenic hydrogen or cryogenic oxygen, wherein the fuel is introduced in the cold state into the wall structure, is delivered through the cooling ducts while absorbing heat via the inner wall, and is subsequently used to generate thrust, as well as to a wall structure for carrying out this process.

BACKGROUND OF THE INVENTION

A corresponding, fuel-cooled wall structure for firing chambers and thrust nozzles of liquid rocket engines has been known from, e.g., PS 17 51 691. The cooling ducts in the wall structure described there are incorporated in a one-piece basic body made of a material with good thermal conductivity, preferably copper, so that the hot gas-side inner wall and the radial webs between the cooling ducts are integrally connected and consist of the same material (copper). The cooling ducts are closed from the outside with a relatively thick-walled pressure jacket made of a high-strength material with poor thermal conductivity, preferably nickel, which is applied by electroplating, and the outer pressure jacket essentially also absorbs the loads originating from the inner pressure of the firing chamber or the nozzle via the webs. For reasons of better connection between the basic body and the pressure jacket, a thin-walled intermediate layer consisting of the same material as the basic body is applied by electroplating on the webs from the outside.

The following processes take place during the operation of such a wall structure: Hydrogen having a temperature of, e.g., 30° K to 100° K flows through the cooling ducts, and the supporting outer wall approximately assumes this temperature and its diameter even shrinks. This effect is even enhanced by stratification effects in the cooling agent, which warms up at the inner bottom of the duct, i.e., at the inner wall, but remains relatively cold in the outer zones. The inner wall, which is designed as a thin wall for good heat transfer to the cooling agent, is warmed up under the thermal load of the firing chamber or the nozzle by the hot firing gases. The inner wall would like to expand, but is prevented from doing so by the counterpressure of the cold, rigid outer wall via the webs. As a result, material of the inner wall flows in the direction of the transition areas to the webs. The longer the firing time, the stronger is this effect. It stops only when the thermally induced stresses are reduced to the limit of elasticity. Thus, the radial wall thickness of the inner wall, which is thin anyway, continues to decrease approximately in the middle between the webs.

For safety reasons, the firing in the firing space is first terminated by shutting off the supply of oxygen at the end of the firing of the engine, whereas the hydrogen, which also flows through the cooling ducts, still continues to flow for a short time. The thin inner wall is now cooled intensely immediately because of its low thermal capacity, which now leads to a high tensile load in this wall. At least after several starts and prolonged burning times, this may lead in a relatively short time to cracking in the weakened middle zones of the inner wall, which may acutely jeopardize the function of the firing chamber or the nozzle and may lead to their complete destruction.

SUMMARY AND OBJECTS OF THE INVENTION

In light of the serious drawbacks of the prior-art cooling processes and the wall structures corresponding to them, the object of the present invention is to provide a cooling process, including a wall structure suitable for this, which makes it possible to significantly prolong the service life of the engine and to increase the specific impulse of the engine due to a considerable reduction in the thermally induced mechanical stresses.

According to the invention, a process is provided for cooling engine walls with fuel. The engine walls have a structure which has an inner wall, to which hot gas is admitted during the operation, an outer wall, which is colder during the operation, as well as a plurality of webs which connect the inner wall to the outer wall and divide the hollow space present there into a plurality of cooling ducts, especially for cooling the firing chamber walls and thrust nozzle walls of rocket engines with cryogenic hydrogen or cryogenic oxygen. The process includes introducing fuel in a cold state into the wall structure and delivering the fuel through the cooling ducts while absorbing heat via the inner wall. The fuel is subsequently used to generate thrust. A hot fluid flow, which is small in relation to the throughput of fluid through the engine, is admitted to the "cold" outer wall of the wall structure, through which fuel flows. The outer wall either thermally expands as a result or at least its thermal contraction is reduced.

The wall structure according to the invention for carrying out the process of the invention includes a thin inner wall to which hot gas is admitted, with a thicker outer wall, as well as with a plurality of webs connecting the inner wall to the outer wall. The webs form a hollow structure with a plurality of cooling ducts which laterally join each other. An additional cover jacket is provided arranged at a spaced location from the outer wall. A plurality of the webs are arranged between the outer wall and the cover jacket. The outer wall, the cover jacket and the webs form a hollow structure with a plurality of heating ducts for guiding a hot fluid flow.

The "cold" outer wall of the wall structure is heated according to the present invention from the outside with a hot fluid flow taken from the engine, as a result of which the difference between the mean temperature of the inner wall and the mean temperature of the outer wall can be considerably reduced compared with prior-art cooling processes and wall structures with cold, unheated outer wall. As a result, the thermally induced stresses in the wall structure also decrease considerably, so that their service life can be increased several fold.

The usual wall structure is modified for this purpose according to the present invention such that an additional heating structure comprising an outer, stable cover jacket and a plurality of webs between the outer wall and the cover jacket is applied to the so-called outer wall, by which the wall limiting the cooling structure toward the outside of the engine is meant. The webs divide the hollow heating structure into a plurality of heating ducts, whose lateral sealing against each other does not have to be hermetic. For example, the manufacturing-technical requirements in the contact or connection area between the web and the cover jacket also decrease as a result.

The hot fluid delivered through the heating ducts, which is taken from the engine, may be either a hot gas generated by firing or a fluid heated by heat exchange, e.g., hot fuel. Based on the relatively low necessary throughput of heat-releasing hot fluid on a weight basis, as well as based on the fact that the heat released remains extensively in the engine process, there are practically no power losses, e.g., in the form of loss of thrust. On the contrary, the present invention even makes it possible to increase the firing chamber pressure and consequently the thrust as a consequence of the increased "fatigue resistance" of the wall structure.

The process of the invention further preferably provides that the hot fluid flow needed for admission to the wall structure through which fuel flows is provided by tapping combustible gas from the firing chamber in the vicinity of the injection head and/or by using at least a partial flow of the exhaust gas of the turbine (or turbines) driving the fuel pumps or by using an unburned fuel flow ($\dot{m}_3$) used as a cooling agent, which is intensely heated by heat exchange.

The apparatus of the invention preferably provides that the webs extending from the outer wall to the cover jacket are made integral with the outer wall and preferably consist essentially of the same material with low thermal conductivity, such as for example nickel or steel, and that the cover jacket preferably consists essentially of a high-strength material likewise having low thermal conductivity, e.g. nickel or steel. The cover jacket is preferably manufactured by a process such as electroplating or flame spring or as a multipart sheet metal shell.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 2 is a schematic half longitudinal sectional view through the firing chamber and the thrust nozzle of a rocket engine as well as the corresponding cooling agent flow.

DESCRIPTION OF THE PREFERRED EMBODIMENT

Figure 1:
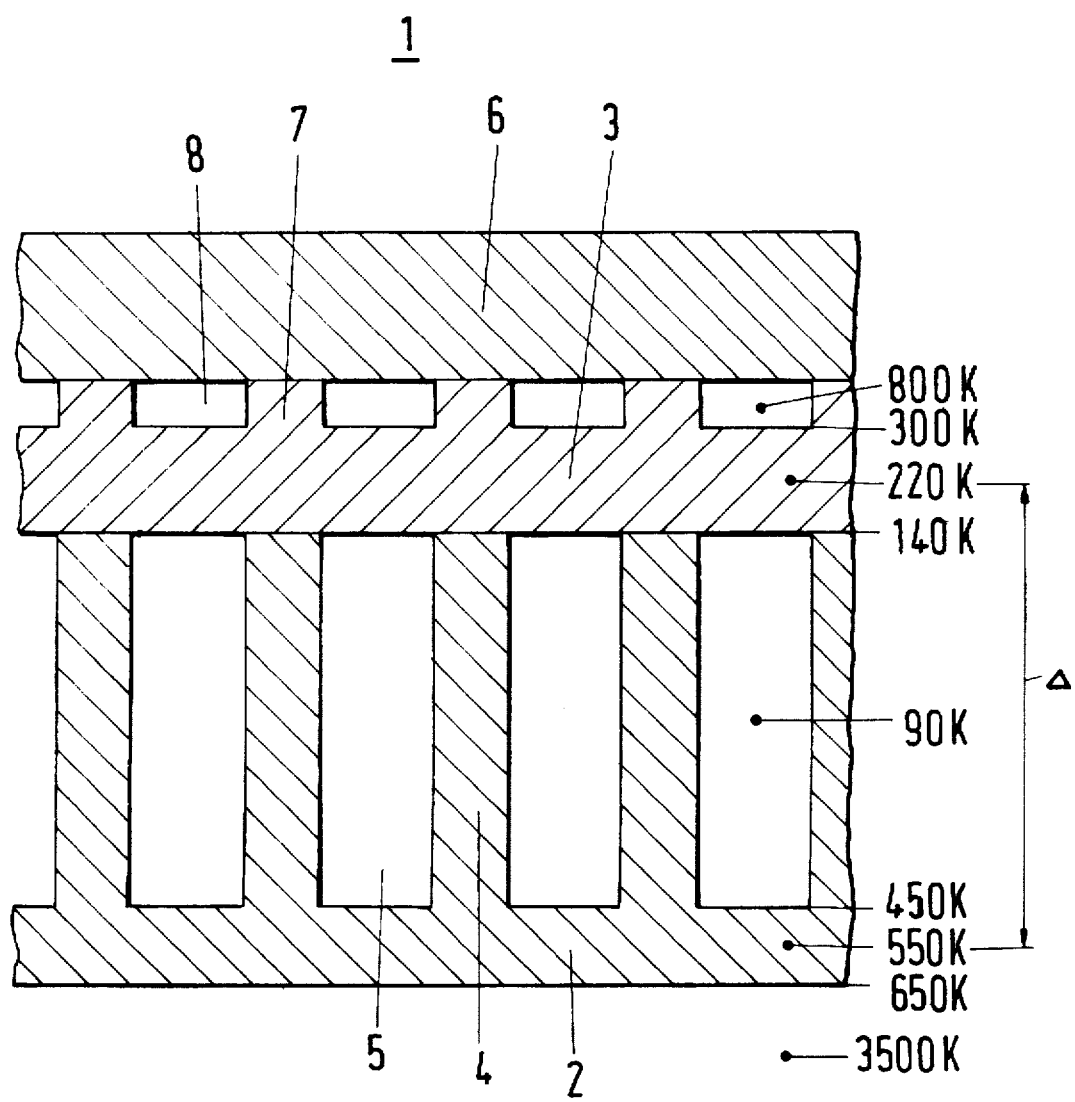
FIG. 1 is a partial cross sectional view through the wall structure of a rocket engine cooled with cryogenic fuel.

For the sake of simplicity, the wall structure 1 in FIG. 1 is shown as if its wall elements, i.e., the inner wall 2, the outer wall 3, and the cover jacket 6 were flat-surface formations. It is clear to the person skilled in the art that their contours are, in reality, adapted to the cross-sectional shape of the engine. In most cases, they are consequently circular contours with respective constant radii of curvature. The wall structure is relatively thin in relation to the radii of curvature of its wall elements, especially in the case of large engines, so that the geometric conditions will again be similar to those in FIG. 1.

According to the representation selected, the hot interior of the engine is located under the inner wall 2, and the outside of the engine, which is at the ambient temperature and is cold relative to it, is located above the cover jacket 6.

The inner area of the wall structure 1 is formed by the inner wall 2, the webs 4 and the outer wall 3. The inner area accommodates the cooling ducts through which cold fuel flows. The wall 3 is intentionally referred to as the outer wall herein. The wall structure based on inner wall 2, the webs 4 and an outer wall has a prior-art design and has been successfully used in engines for many years. This area of the wall structure 1 may also be called the cooling structure proper.

The wall structure is expanded according to the present invention to the outside upward in FIG. 1 by additional webs 7, heating ducts 8 through which hot fluid flows, and by a cover jacket 6, which is in direct contact with the environment. This area of the wall structure may be called a heating structure, and the so-called outer wall 3, acting as a partition that is in contact with both fluids (cold/hot), belongs to both the cooling structure and the heating structure.

Exemplary values for the temperatures to be expected locally are shown to the right of the sectional view. The highest temperature of 3,500° K prevails in the interior of the engine during at least extensively stoichiometric firing of the fuel. In contrast, the temperature of the still cryogenic fuel (e.g., $LH_2$), which is pumped as a cooling agent through the cooling ducts 5, is only 90° K. The temperature of the hot fluid delivered through the heating ducts 8 for the purpose of stress reduction is again substantially higher, namely, 800° K.

As a result, the partition 3 separating the hot and cold fluids is brought to a mean temperature of 220° K (underlined value). Thus, the difference Δ between the mean temperatures of the walls 2 and 3 is 330° K (550° K–220° K).

In the case of a wall structure without the outer heating structure according to the present invention, the mean temperature of the outer wall could be 90° K, i.e., the temperature of the cooling fluid. With the same mean temperature of the inner wall of 550° K, the temperature difference Δ would thus equal 460° K and this would lead to substantially higher thermal stresses. The known consequences would be the above-described disadvantages (flow of material, cracking, etc.).

The hot fluid flow needed for the combination of the cooling and heating process according to the present invention, whose amount is rather small, is generated in or taken from an appropriate point in the engine itself. The hot fluid may be 1. a combustion gas, or
2. an unburned cooling fluid (fuel) intensely heated by heat transfer.

In case 1, the hot fluid may be provided as follows:

a) by tapping from the firing chamber (main firing chamber) in the vicinity of the injection head, b) by the use of the exhaust gas of the turbines in bypass-flow engines, and, c) in the case of main-stream engines, by branching off a small percentage of the turbine exhaust gases, wherein the direction of flow of the hot gases in the wall structure may be in or opposite the direction of flow in the firing chamber (parallel flow or counterflow).

With all three possibilities, the hot fluid is mixed with the main exhaust gas flow of the engine at an appropriate point after flowing through the wall structure. In the case of a lower pressure level of the hot fluid after the release of heat (cases a) and b)), this mixing is preferably carried out in the area of the nozzle (low exhaust gas pressure), and preferably in the firing chamber and in the vicinity of the injection head (case c)) in the case of a higher pressure level of the hot fluid. These possibilities are easy for the person skilled in the art to understand and therefore they are not shown separately.

FIG. 2 shows an example of case 2. i.e., the supplying of hot fluid by heat transfer. The firing chamber 9 with the nozzle throat 10 and the front part of the thrust nozzle, as well as the expansion nozzle 11 joining as a separate component, can be recognized in a schematic half longitudinal section through a fluid-cooled rocket engine.

The wall structure of the expansion nozzle 11, which is rather uncritical in terms of service life, is designed only as a "single-level" wall structure in the known manner, and it is thus cooled only.

The wall structure of the critical firing chamber 9 including the nozzle neck 10 and the front area of the nozzle is of a "two-level" design according to the present invention, and it is consequently cooled and heated.

The arriving cryogenic main cooling flow, which is under high pressure, is designated by $\dot{m}_1$. This is split into two partial flows $\dot{m}_2$ and $\dot{m}_3$, the first of which is led through the inner area of the "two-level" wall structure to the injection head, and the second through the single wall structure of the expansion nozzle 11 to the discharge-side end of this nozzle 11. The fluid flow $\dot{m}_3$, which is now already heated intensely, is sent from the end of the expansion nozzle to the downstream end of the front part of the nozzle, and it is introduced into the outer layer of the "two-level" wall structure there. In this wall structure, it flows into the area of the injection head of the firing chamber 9 (counterflow), while releasing heat. As an alternative, $\dot{m}_3$ may also be sent from the injection head to the nozzle through the outer layer of the wall structure in a counterflow process. Subsequently, i.e., after the release of heat to the wall structure, $\dot{m}_3$ is introduced into the main mass flow of the engine, namely, alternatively into the injection head (EK), into the/one prechamber (VK, in the case of a main-stream engine), into the/one gas generator (GG, in the case of a bypass-flow engine), or into the nozzle.

The reduction in the temperature difference by at least 30% (calculation example) between the inner wall and the outer wall of the cooling structure proper, which can be achieved by the present invention, prolongs the service life of a high-load rocket firing chamber more than threefold compared with the values that can be reached with the prior-art design.

As an alternative to this, the inner wall temperature can be changed at equal service life, and the cooling pressure loss can thus be markedly reduced (to about 50%). As a result, a lower pump pressure can be selected, or the firing chamber pressure can be increased, both of which ultimately increase the specific impulse of the engine.

While specific embodiments of the invention have been shown and described in detail to illustrate the application of the principles of the invention, it will be understood that the invention may be embodied otherwise without departing from such principles.

What is claimed is:

1. A process for cooling engine walls with fuel, the walls having a structure including an inner wall to which hot gas is admitted during engine operation, an outer wall, which is colder during the operation, as well as a plurality of webs which connect the inner wall to the outer wall and divide a hollow space present between the inner wall and the outer wall into a plurality of cooling ducts, the process comprising the steps of:

introducing the fuel in a cold state into the wall structure, delivering the fuel through the cooling ducts while absorbing heat via the inner wall;

subsequently using the fuel to generate thrust;

providing a hot fluid flow, having a temperature which is higher than the fuel in the cold state, said hot fluid flow being small in relationship to a fuel throughput of the engine;

admitting said hot fluid flow to a region contacting said outer wall structure to allow said outer wall to thermally expand or to produce thermal contraction.

2. A process according to claim 1, further comprising:

providing said hot fluid flow from one of combustible gas tapped from a firing chamber of the engine in the vicinity of an injection head, a partial flow of exhaust gas of a turbine driving fuel pumps, and an unburned portion of the fuel flow used as a cooling agent, said unburned portion having been intensely heated by absorbing heat via the inner wall.

3. A wall structure for cooling firing chamber walls and thrust nozzle walls of rocket engines with cryogenic hydrogen or cryogenic oxygen, comprising:

an inner wall, an outer wall, said inner wall being thinner than said outer wall;

a plurality of webs connecting said inner wall to said outer wall, said inner wall, said outer wall and said webs defining a hollow structure forming a plurality of cooling ducts which laterally join each other;

an additional cover jacket arranged at a spaced location from said outer wall;

a plurality of additional webs arranged between said outer wall and said cover jacket, said outer wall and said cover jacket and said additional webs defining a hollow structure with a plurality of heating ducts for guiding a hot fluid flow.

4. A wall structure according to claim 3, wherein said additional webs, extending from said outer wall to said cover jacket are made integral with said outer wall.

5. A wall structure according to claim 4, wherein said additional webs are formed of the same material as said outer wall.

6. A wall structure according to claim 5, wherein said material is either nickel or steel.

7. A wall structure according to claim 3, wherein said cover jacket is formed of a high-strength material.

8. A wall structure according to claim 7, wherein said material of said cover jacket is one of nickel or steel.

9. A wall structure according to claim 7, wherein said cover jacket is manufactured by one of electroplating, flame spraying and a multipart sheet metal shell.

10. A process for cooling the firing chamber walls and thrust nozzle walls of rocket engines with cryogenic hydrogen or cryogenic oxygen, the walls having a structure including an inner wall to which hot gas is admitted during the operation, an outer wall, which is colder during the operation, as well as a plurality of webs which connect the inner wall to the outer wall and divide a hollow space present between the inner wall and the outer wall into a plurality of cooling ducts, the process comprising the steps of:

introducing the cryogenic hydrogen or cryogenic oxygen in a cold state into the wall structure, delivering the cryogenic hydrogen or cryogenic oxygen through the cooling ducts while absorbing heat via the inner wall;

subsequently using the cryogenic hydrogen or cryogenic oxygen to generate thrust;

providing a hot fluid flow, having a temperature which is higher than the cryogenic hydrogen or cryogenic oxygen in the cold state, said hot fluid flow being small in relationship to a cryogenic hydrogen or cryogenic oxygen throughput of the engine;

admitting said hot fluid flow to a region contacting said outer wall structure to allow said outer wall to thermally expand or to produce thermal contraction.

11. A process according to claim 10, further comprising:
providing said hot fluid flow from one of combustible gas tapped from a firing chamber of the engine in the vicinity of an injection head, a partial flow of exhaust gas of a turbine driving fuel pumps, and an unburned portion of the fuel flow used as a cooling agent, said unburned portion having been intensely heated by absorbing heat via the inner wall.

* * * * *